United States Patent [19]
Pirl et al.

[11] Patent Number: 5,483,033
[45] Date of Patent: Jan. 9, 1996

[54] APPARATUS AND METHOD FOR SEQUENTIALLY REGISTERING TOOL MODULES FOR A WELDING OPERATION OF A TUBE

[75] Inventors: William E. Pirl, Penn Township, Westmoreland County; Kurt K. Lichtenfels, Murrysville, both of Pa.

[73] Assignee: Westinghouse Electric Corporation, Pittsburgh, Pa.

[21] Appl. No.: 133,428

[22] Filed: Oct. 8, 1993

[51] Int. Cl.⁶ ............................................. B23K 26/08
[52] U.S. Cl. ............................ 219/121.64; 219/59.1
[58] Field of Search ........................ 219/121.63, 121.64, 219/60.2, 61, 125.11, 59.1; 901/41, 42

[56] References Cited

U.S. PATENT DOCUMENTS

| | | | |
|---|---|---|---|
| 4,080,525 | 3/1978 | Gobetz | 219/121.63 |
| 4,222,699 | 9/1980 | Dunn et al. | 414/750 |
| 4,347,652 | 9/1982 | Cooper, Jr. et al. | 29/407 |
| 4,373,855 | 2/1983 | Lebouc | 414/750 |
| 4,694,136 | 9/1987 | Kasner et al. | 219/121.63 |
| 4,741,078 | 5/1988 | Kimura | 901/41 |
| 4,741,471 | 5/1988 | Sullivan | 228/166 |
| 4,829,648 | 5/1989 | Arzenti et al. | 29/157.4 |
| 4,876,871 | 10/1989 | Arzenti et al. | 72/122 |
| 5,006,694 | 4/1991 | Handke et al. | 219/121.63 |
| 5,182,429 | 1/1993 | Pirl et al. | 219/121.63 |

*Primary Examiner*—Clifford C. Shaw

[57] ABSTRACT

A frame is coupled to a remotely operable service arm (ROSA), and a rotatable carousel, in turn, is carried by the frame to position several tool modules used in a welding operation adjacent to a damaged tube in a tubesheet of a nuclear steam generator. The arm positions an alignment module directly beneath the damaged tube and the module aligns the carousel. The carousel is rotated to sequentially align and register a laser welding module, a cleaning module, and an inspection module with the damaged tube for a welding operation on a lower portion of the damaged tube in the tubesheet area. One embodiment for the alignment module has a pneumatically operated pin which is operator controlled, and which has an increasing diameter from its distal end to obtain a gross to a vernier alignment of the carousel and, thus, a proper alignment for the remaining modules. A further embodiment provides an alignment pin which is automatically computer controlled without operator intervention. Limit switches and grooves are used as a logic checking device for the proper positioning of a respective module in the frame, and a pneumatically operated radial pin holds the module in the frame.

9 Claims, 9 Drawing Sheets

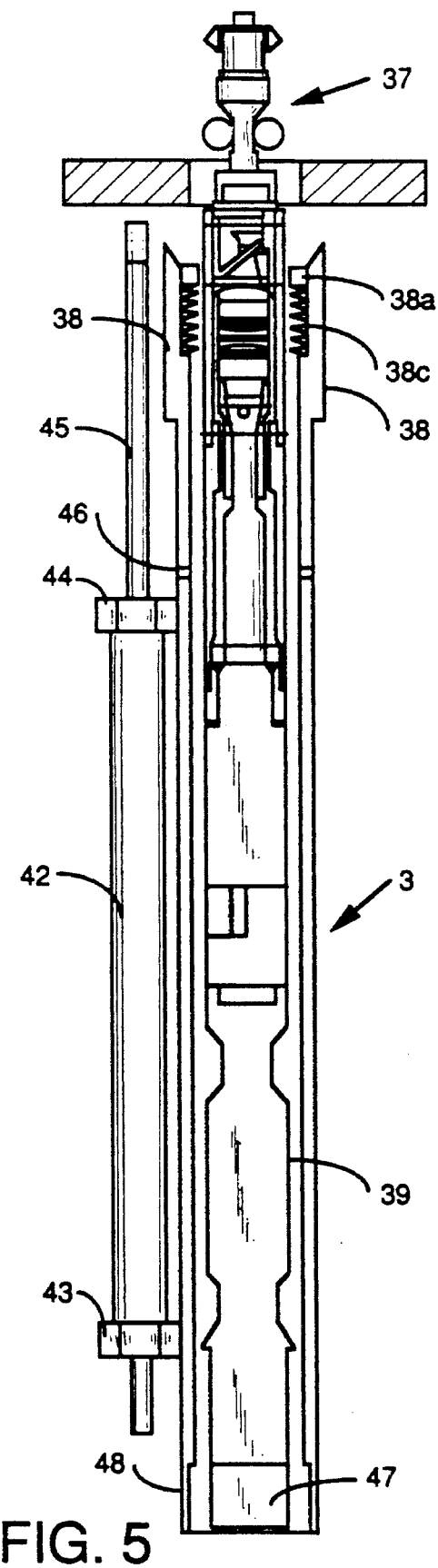
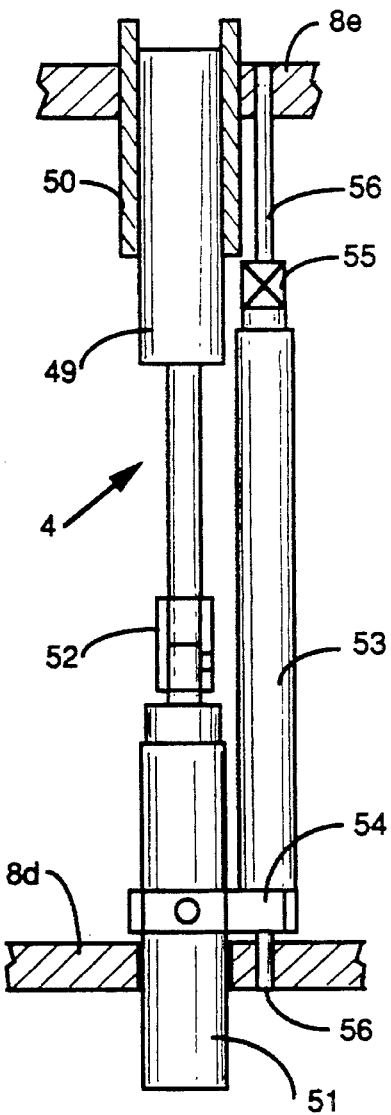
FIG. 5
FIG. 6

APPARATUS AND METHOD FOR SEQUENTIALLY REGISTERING TOOL MODULES FOR A WELDING OPERATION OF A TUBE

BACKGROUND OF THE INVENTION

This invention relates to an apparatus and method for first aligning and then positioning several tools or devices used in a welding operation for a lower portion of a damaged heat exchange tube extending in a bore of a tubesheet of a nuclear steam generator.

Nuclear steam generators are comprised of three principal parts, which are a primary side, a tubesheet in which a bundle of U-shaped tubes are mounted, and a secondary side. The tubesheet and U-shaped tubes hydraulically isolate the primary and the secondary sides, while thermally connecting them together so that heat from the radioactive water in the primary side is transferred to the non-radioactive water in the secondary side. This heat transfer is accomplished by the U-shaped tubes mounted in the tubesheet that extend throughout the secondary side of the steam generator. The inlet and outlet ends of these U-shaped tubes are mounted in the side of the tubesheet that faces the primary side of the generator. The primary side in turn includes a divider plate that hydraulically isolates the inlet ends of the U-shaped tubes from the outlet ends.

Hot, radioactive water heated by the nuclear reactor flows through the inlets in the tubesheet and circulates around the U-shaped tubes that extend within the secondary side of the steam generator. This hot, radioactive water transfers its heat through the walls of the U-shaped tubes to the non-radioactive water that surrounds the tubes in the secondary side of the generator, thereby converting the water to non-reactive steam. After the nuclear heated water circulates through the U-shaped tubes, it flows back through the tubesheet, through the outlets of the U-shaped tubes, where it is ultimately circulated back to the nuclear reactor.

The U-shaped tubes are supported by several spaced-apart support plates and the inlet and outlet ends extend through the tubesheet. Over long periods of time, the heat exchanger tubes of such nuclear steam generators can suffer a number of different types of corrosion degradation, including intragranular stress corrosion cracking. Tests have shown that even though corrosion cracking occurs in the area of the tube supported in the support plates, that most of this intragranular stress corrosion cracking of the tubes occurs around the tubesheet region of the generator where the inlet and outlet ends of the U-shaped tubes extend through the bores in the tubesheet. These conditions can result in the tube becoming defective such that a leak occurs which not only creates an ineffective heat exchanger, but also creates a radioactive contamination problem. Since the fluid flowing in the tubes of the nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube must either be plugged or repaired so that the coolant does not leak from the tube.

Typically, the method used to repair a heat exchange tube in a nuclear steam generator is one in which a metal sleeve having an outside diameter slightly smaller than the inside diameter of the defective tube is inserted into the defective tube and attached to the defective tube to repair the defective or weakened area of the walls of the tube.

Examples of a sleeve loading mechanism is set forth in U.S. Pat. No. 4,711,526 issuing to Thomas E. Arzenti and William E. Pirl, and U.S. Pat. No. 4,829,648 issuing to Thomas E. Arzenti, William E. Pirl, and Annette M. Costlow. Both of these patents are assigned to the Westinghouse Electric Corporation and both are incorporated herein by reference.

Generally, laser welding is used to internally weld the sleeve to the tube in a heat exchanger since it is faster and produces a smaller heat affected zone compared to arc welding and brazing the joining metals, which were prior joining methods for welding the sleeve. An example of a device for laser welding of a sleeve within a tube is disclosed in U.S. Pat. No. 4,694,136 issuing on Sep. 15, 1987, to William H. Kasner et al., and assigned to Westinghouse Electric Corporation.

A further example of a device for laser welding of the inner surface of a tube is disclosed in U.S. Pat. No. 5,182,429, issued on Jan. 26, 1993, and assigned to Westinghouse Electric Corporation, which features a specific design for an elongated tubular welding housing which is inserted into the tube to be welded. In operation, the elongated tubular welder housing is introduced through the manway. The laser welding operation is followed first by a cleaning operation of the welded area by a water assisted hone brush which is rotated and pulled axially through the tube and then an inspection of the welded area by an inspection device.

Each of the several tools, such as the above discussed sleeve loading mechanism, the laser welding mechanism, the hone brush mechanism for cleaning the weld, and the inspection mechanism for inspecting the weld is individually manipulated within the radioactive, primary side of the nuclear steam generator by being independently and individually coupled to a robotic arm or a remotely operable service arm (ROSA), that has been invented and developed by personnel of the Westinghouse Electric Corporation. This robotic arm is located inside the nuclear generator by being attached to the tube sheet and extends through a manway in the bottom of the generator for access to the tooling.

Many of the tools discussed above are effectively used for inserting sleeves into and repairing a defective tube at the support plates for the U-shaped tubes or in the upper tubesheet region in the generator. If a sleeve is required at the bottom of the tubesheet, the normal practice is to perform a hard rolling expansion process which results in the joint being structurally sound, and which process is not normally performed on the joints between the sleeve and tube at the support plates and in the upper tubesheet region due to inaccessibility of these areas. However, in some instances, welding of the joint between the sleeve and the damaged tube at the bottom of the tubesheet may be desirable especially for gas, leak testing purposes. The several tools discussed hereinabove for performing a welding operation for the joints between the sleeve and the tube at the support plates and in the upper tubesheet region are generally not as effective for performing a welding operation for a joint in the bottom of the tubesheet since they are primarily designed to function while encapsulated within the tube and, preferably, the tools used for the joint in the bottom of the tubesheet should be designed to operate in air.

For a sleeving operation in a tube of a tubesheet for a nuclear steam generator, the initial cleaning operation of the entire tube is done with a water-hone brush which rotates and which is axially pulled through the tube, resulting in the joint between the sleeve and the bottom of the tubesheet also being cleaned. The several sleeves are inserted into the tube from the top down to the bottom of the tube, and hydraulically expanded at the same time. The joints are then welded from the top down. Normally, the joint at the bottom of the tubesheet cannot be properly welded since the present-day designs for the weld heads do not provide adequate constraint for the weld head in this bottom tubesheet area. The joints near the support plates and the upper part of the tubesheet normally require ultrasonic inspection due to the structural criteria, but the joint in the lower portion of the tubesheet only requires visual inspection.

There is a need for an apparatus used in the welding operation of a joint between the sleeve and the tube in the lower area of a tubesheet which constrains the several tools used in a welding operation.

There is a further need for an apparatus used in a welding operation of a lower joint in a tube in a tubesheet which is capable of making readily available the several necessary tools to accomplish the task. Ideally, such an apparatus should be easily and remotely manipulable within the radioactive environment of the primary side of the generator by means of a commercially available robotic arm. It would be desirable if the operator of the device combined the sequential steps of first positioning the end effector of the robotic arm, followed by welding, then cleaning the weld, and visually inspecting the weld by indexing and positioning the several mechanisms for doing these operations relative to a damaged tube being repaired so that the entire welding operation is substantially accelerated, and the maintenance operator's exposure to potentially harmful radiation is minimized.

SUMMARY OF THE INVENTION

The invention is a lower weld tooling apparatus for use in a welding operation of a sleeve to an inside wall of a lower portion of a tube in the lower tubesheet area that obviates or at least ameliorates the aforementioned shortcomings associated with the prior art. The lower weld tooling first aligns the apparatus relative to the damaged tube and then is rotated to sequentially weld, clean, and visually inspect the joint between the sleeve and tube in the lower tubesheet area. The lower weld tooling device carries the several tool modules for performing the several steps in a welding operation.

The invention is easily coupled to an end effector of a remotely operated service arm (ROSA) or a robotic arm for the remote insertion, positioning, and operation of the several tools for a welding procedure. The device comprises a frame attachable to the robotic arm, and a carousel carried by the frame. The carousel is generally a circular conveyor and carries several tool modules, such as an alignment module, a laser welding module, a brush cleaning module for removing fragments generated during the welding procedure, and a visual inspection module which inspects the welded joint between the sleeve and the cladding of the tube in the lower tubesheet area.

Preferably, the alignment module carried by the carousel is operated first and is aligned with the longitudinal axis of the tube under repair. The alignment module comprises a pin mounted to a pneumatic piston cylinder assembly for longitudinal movement into and out of the tube. The pin has several stepped portions with increasing diameters from its distal end toward its proximal end, which serve as a gross to a vernier alignment of the longitudinal axis of the pin to the longitudinal axis of the tube. A proper alignment of the pin is done by inserting the pin into the tube under repair, and this is done by an operator who visually monitors and controls the alignment procedure by manually pushing the appropriate buttons to control a computer, which, in turn, operates the movement of the alignment module, the movement of the robotic arm, and the rotation of the carousel.

The radial distance of the centerline of the remaining tool modules, that is, the laser welding module, the cleaning module, and the inspection module to the centerline of the carousel is the same radial distance as the centerline of the alignment module is to the centerline of the carousel. That is, the centerlines of the several tool modules form an imaginary concentric circle around the centerline of the carousel, so that after proper alignment of the alignment module, rotation of the carousel at a predetermined speed brings the remaining modules into precise alignment with the longitudinal axis of the tube to be repaired without further operation of the lower weld tooling apparatus. Each module is fixed in position within the frame by way of a radial pin which is inserted in an aperture in the sidewall of the carousel. After the pin is retracted, the carousel is rotated at a velocity to index the next module, and the pin is inserted in the aperture of the registered module. Preferably, two limit switches are used as a computer logic checking device for the specific module presently in line with the tube under repair. For example, activation of a first limit switch represents the positioning of the alignment module, activation of the second limit switch represents the positioning of the laser welding module, activation of both limit switches represents the positioning of the cleaning module, and activation of none of the two limit switches represents the positioning of the inspection module relative to the damaged tube.

In a method of the invention, the carousel is rotated until the alignment module is in vertical alignment with the opening of a damaged tube. After the initial alignment is made by ROSA, the alignment pin is moved longitudinally so that the tapered distal end enters the opening. The operator visually observes the positioning of the pin relative to the tube opening, and if necessary, manually operates the computer to jog ROSA and longitudinally moves the pin until its centerline is in alignment with the centerline of the tube. The pin is then retracted and the carousel is rotated a predetermined speed to first index the laser welding mechanism for its operation, and then sequentially indexing the cleaning and the inspection mechanisms to effect a weld joint between the sleeve and the heat exchange tube.

It is a further object of the present invention to provide an apparatus and a method for reliably and expeditiously performing all of the required steps to produce a seal weld between a heat exchange tube and a sleeve located near the clad area of a tubesheet in a nuclear steam generator.

It is a further object of the present invention to provide an apparatus and method for performing a welding operation in a lower joint in a tube which includes a carousel for carrying several tools for the welding operation and means for aligning the carousel with the damaged tube and rotating the carousel to automatically align the remaining tools with the tube for their sequential operation.

It is a further object of the invention to provide a system for effecting a weld joint between a heat exchange tube and a sleeve which includes a carousel mountable on an end effector and carrying an alignment module, a laser welding module, a cleaning module, and weld inspection module for performing the required steps in a welding operation.

These and other objects of the present invention will be more fully understood and appreciated from the following description of the invention on reference to the illustrations appended herein.

BRIEF DESCRIPTION OF THE DRAWINGS

FIG. 5 is an enlarged, cross-sectional view of a welding module including a laser welding head;

FIG. 6 is an enlarged, partly cross-sectional view of a brush cleaning module;

DESCRIPTION OF THE PREFERRED EMBODIMENT

Figure 1:
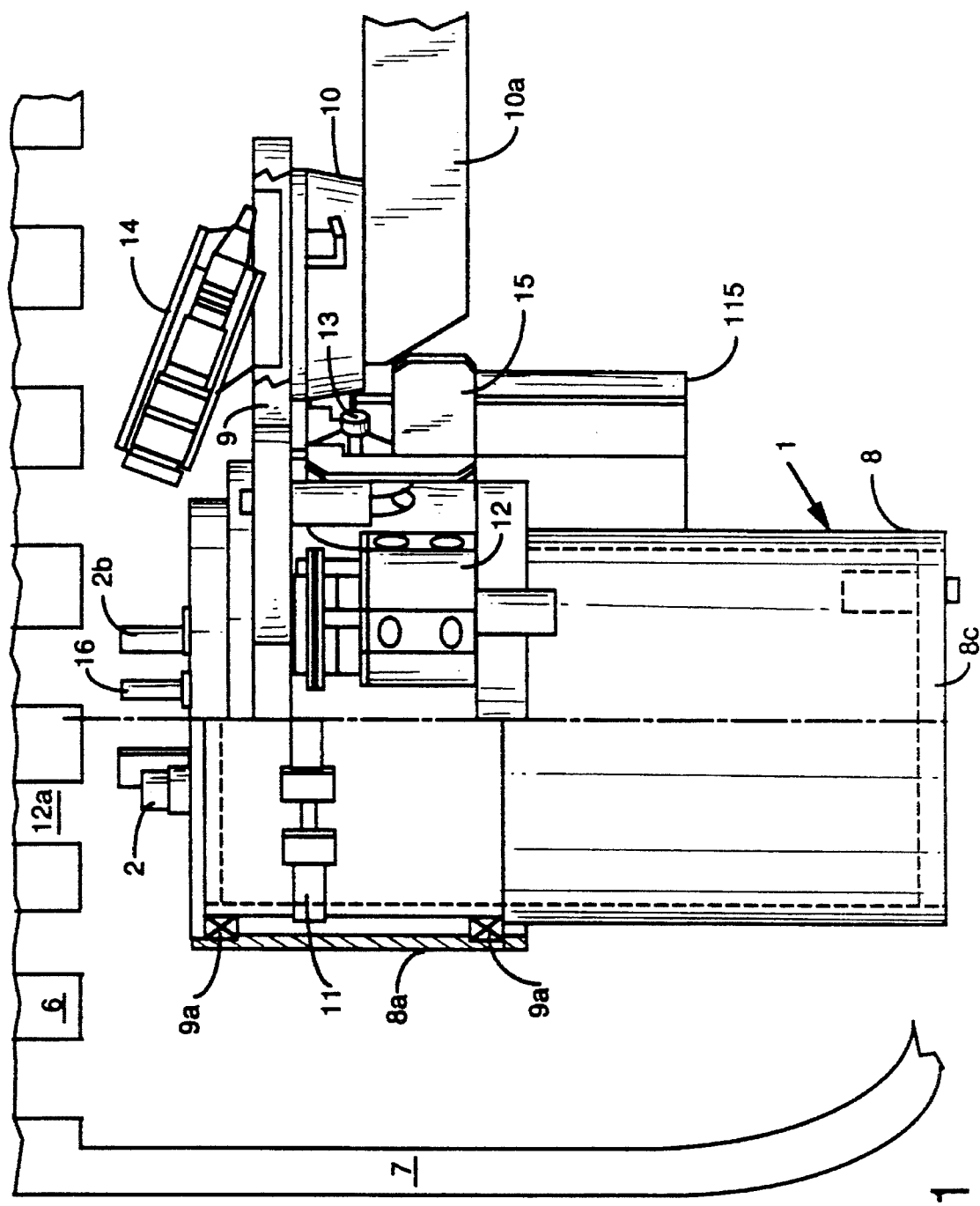
FIG. 1 is an elevational view, partly in cross-section, of a carousel of the present invention in a nuclear steam generator.

With reference to FIG. 1, wherein like numbers designate like components throughout all of the several figures, the general purpose of carousel 1 is to carry several tool modules indicated at numbers 2, 3, 4, and 5, particularly shown in FIGS. 2–10 for a welding operation of a sleeve in a lower portion of a damaged tube extending in a tubesheet 6 of a nuclear steam generator 7. To that end, and referring particularly to FIGS. 1, 2, and 3, carousel 1 has an inner housing 8, and an upper outer housing 8a with a bottom plate 8e, an intermediate plate 8d, and a top plate 8c supported in and carried by a frame 9 which, in turn, is coupled to an end effector 10 of a remotely operated service arm (ROSA), a portion of which is shown at 10a in FIG. 1. Inner housing 8 is rotated relative to outer housing 8a via bearings 9a by a drive belt 11 and motor assembly 12.

Figure 2:
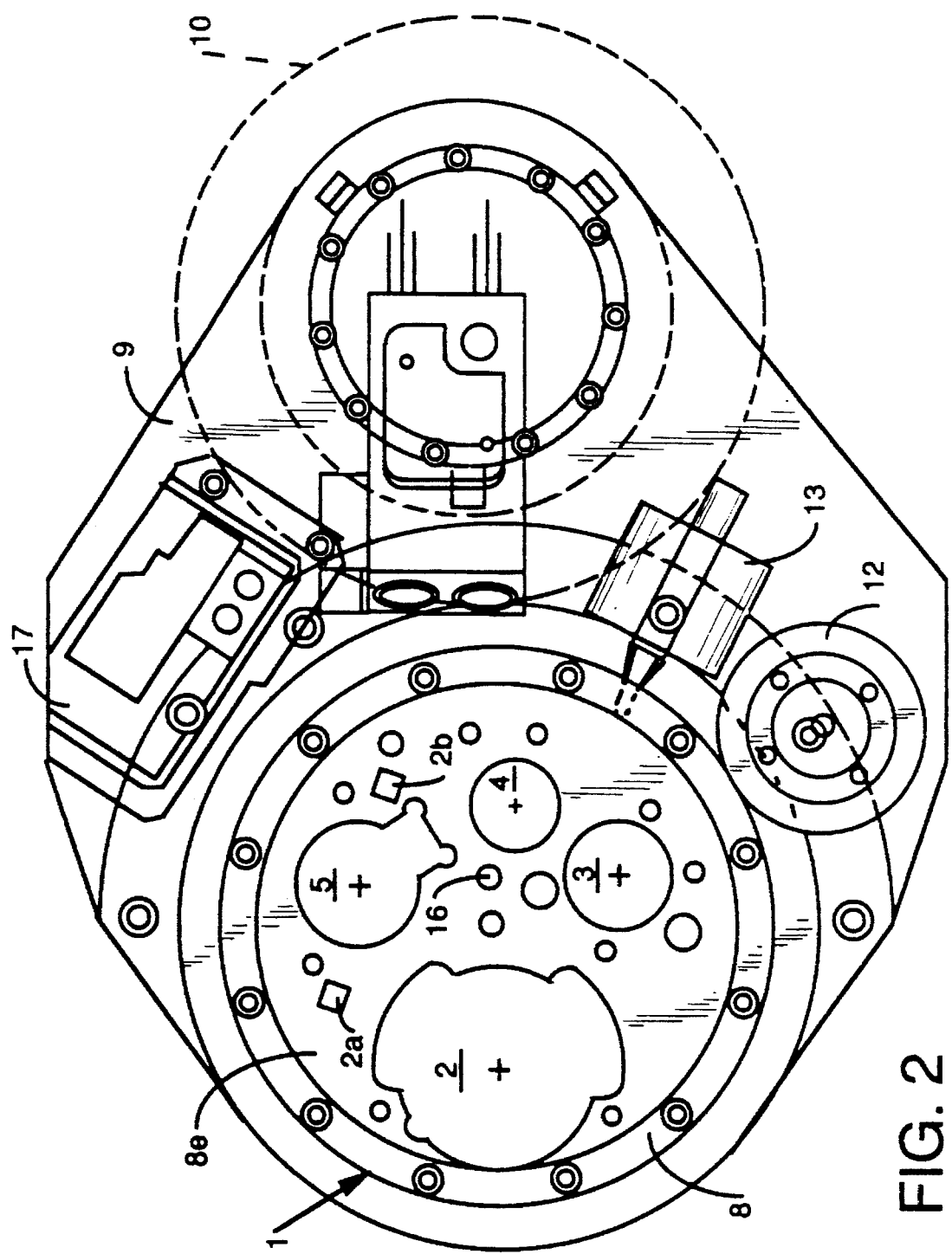
FIG. 2 is an enlarged top plan view of the carousel of the present invention mounted on a ROSA and indicating the openings for receiving the several modules used in a welding operation.

Even though not shown, motor assembly 12 has a sprocket which drives a chain of the drive belt 11 which is attached to inner housing 8. Once rotated and in a desired positioning, inner housing 8 is fixed by a pneumatically operated pin 13 (FIG. 2) which enters one of the several apertures provided along the sidewall of inner housing 8 and associated with a respective tool module 2, 3, 4, and 5. When pin 13 is engaged in an aperture, a limit switch associated with pin 13 shuts off motor assembly 12 to interrupt rotation of inner housing 8. Visual observation of the operation of carousel 1 and module tools 2, 3, 4, and 5 for the operator is by way of a camera assembly and light 14 mounted on frame 9. In FIG. 2, top plate 8e shows the several apertures for receiving tool modules 2, 3, 4 and 5.

Referring particularly to FIG. 1, carousel 1 comprises an alignment tool module 2 for aligning carousel 1 with a damaged tube 12a to be repaired, a laser welding module 3, a cleaning module 4, and an inspection module 5 for inspecting the weld. In the schematic of FIG. 2, the centerlines or working position for the tools for the alignment module 2, the laser welding module 3, the cleaning module 4, the inspection module 5, and the inner housing 8 are represented by a "+". Each of the centerlines for the tool modules 2, 3, 4, and 5 are located the same radial distance from the centerline of housing 8. This becomes important in the operation of the tool modules 2, 3, 4, and 5. Carousel 1 is rotated to initially position the alignment tool of module 2 in frame 9 for positioning of frame 9 by ROSA relative to the centerline of tube 12a of FIG. 1.

Alignment module 2 is operated in a manner to be further discussed, so that its centerline is in alignment with that of tube 12a. Once proper alignment is accomplished, carousel 1 is further rotated to sequentially bring the centerlines of welding module 3, cleaning module 4, and inspection module 5 into alignment with the centerline of tube 12a for their operation. From FIG. 2, it can be seen that the degree of rotation from the centerline of alignment module to that of welding module 3 is about 120 degrees; the degree of rotation from welding module 3 to cleaning module 4 is about 55 degrees; the degree of rotation from cleaning module 4 to inspection module 5 is about 80 degrees and the degree of rotation from inspection module 5 to alignment module 2 is about 105 degrees. The exact or actual degrees of rotation of carousel 1 is not important in that the computer is set up to know the location of the modules 2, 3, 4 and 5, based on the initial alignment of alignment module 2 and the speed of rotation of carousel 1.

This rotation of carousel 1 and the degree of rotation is computerized and is computer controlled. Limit switches are provided in mounting 15 and grooves are provided in the outer surface of inner housing 8 which activate the limit switches, and are used to logically determine the location of the modules 2, 3, 4, and 5 upon rotation of carousel 1. For instance, activation of a first limit switch represents the location of alignment module 2; activation of the second limit switch represents the location of welding module 3; activation of both limit switches represents the location of cleaning module 4; and activation of no limit switches represents the location of inspection module 5.

Particularly referring to FIGS. 1 and 2, an air nozzle 16 is provided to blow debris away from welding module 3 and inspection module 5, and lights 2a and 2b are used in conjunction with inspection module 5, and FIG. 2 indicates the appropriate aperture for receiving components 2a, 2b, and 16 of FIG. 1 by the same numeral as indicated in FIG. 1, more about which will be discussed hereinbelow. A pneumatic manifold 17 has an air line and contains the solenoids to operate the several tools of modules 2, 3, 4, and 5, pin 13, and other components of carousel 1.

Figure 3:
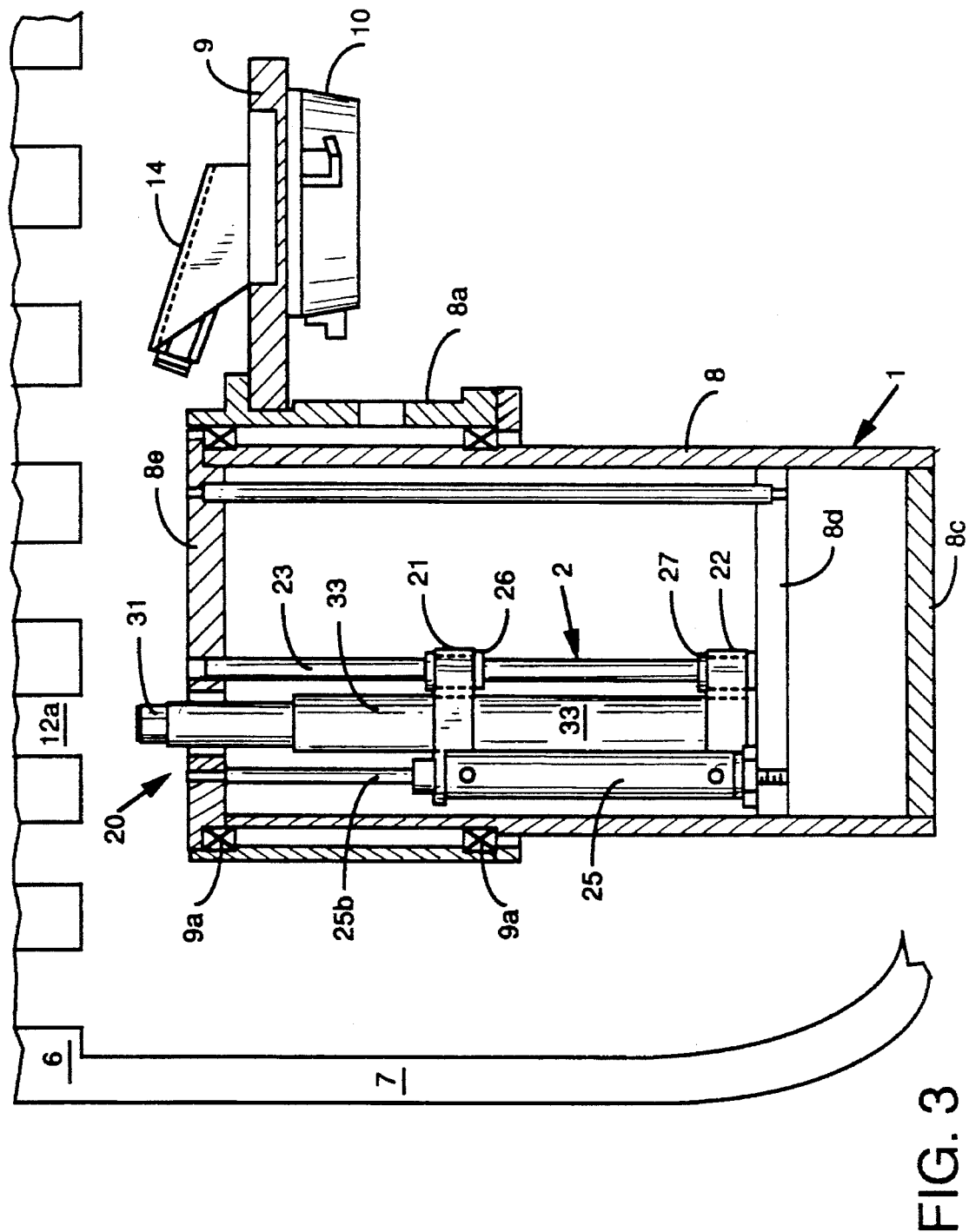
FIG. 3 is a cross-sectional view of the carousel showing a first embodiment for an alignment module carried by the carousel.

In order to perform a welding operation between a tube 12a and its sleeve in the portion of tube 12a extending in the cladding of tubesheet 6 of FIG. 1, carousel 1 is rotated to bring alignment module 2 into a position in frame 9 for ROSA to directly position alignment module 2 beneath tube 12a of FIG. 3. As is known in the art, tubesheet 6 is generally made of carbon steel and for corrosion purposes is cladded with stainless steel. This is known as "cladding" and is generally approximately 3/16 inches thick.

Figure 4:
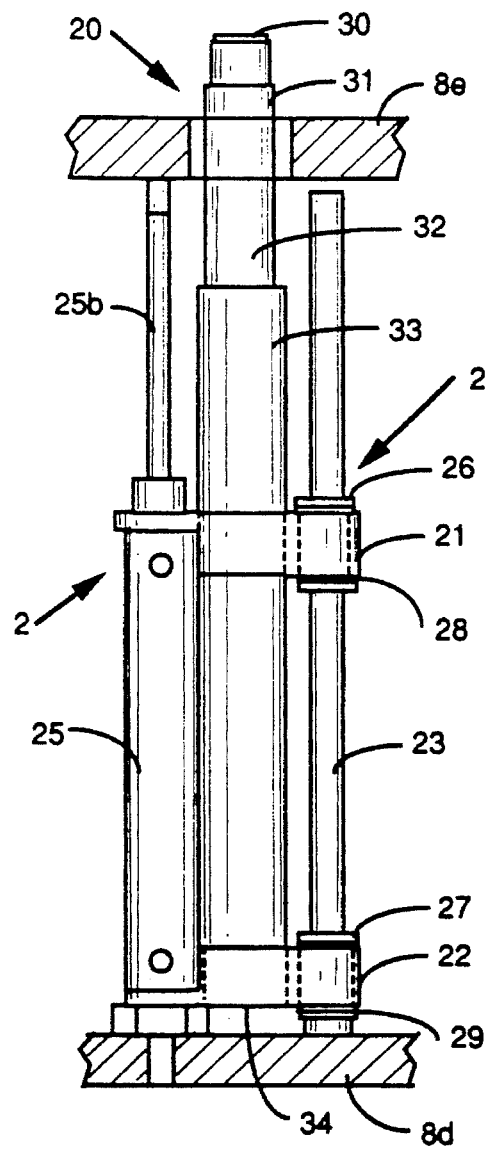
FIG. 4 is an enlarged elevational view of the alignment module of FIG. 3.
Figure 4A:
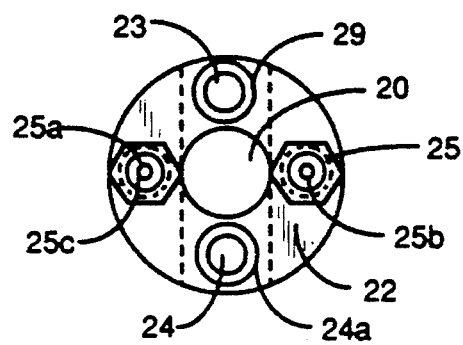
FIG. 4a is an end view rotated 90° out of phase of FIG. 4.

FIGS. 3, 4, and 4a best illustrate alignment module 2, with FIG. 3 illustrating its installation in inner housing 8.

Alignment module 2 is comprised of alignment pin means 20 fixedly attached to support frames 21 and 22, which, in turn, are mounted on linear rods 23 and 24 (FIG. 4a). Pneumatic double ended piston cylinder assemblies 25 and 25a attached to support frames 21 and 22 reciprocate pin means 20 into and out of tube 12a. As best shown in FIG.

4, linear bearings 26 and 27 and retainer rings 28 and 29 are provided to allow reciprocation of frames 21 and 22 on linear rod 23. Similar bearings, one such bearing indicated at 24a in FIG. 4a and retainer rings are provided for frames 21 and 22 and linear rod 24. Double ended cylinders 25 and 25a have threaded ended cylinder rods 25b and 25c, respectively, which are threaded into intermediate plate 8d and top plate 8e of carousel 1. Cylinders 25 and 25a are activated, and frames 21 and 22 along with pin means 20 are slid up and down along linear rods 23 and 24.

Pin means 20 has a tapered distal portion 30 and fixed stepped portions 31, 32, and 33, with portion 33 having a proximate end 34 supported in and carried by frame 22.

The alignment module 2 is brought into the position as shown in FIGS. 1 and 2 directly beneath tube 12a which is to be welded. Pin 13 has already been activated to index and hold alignment module 2 in frame 9 and motor assembly 12 has been deactivated.

ROSA is operated to make the initial alignment relative to tube 12a as shown in FIG. 3. The operator activates alignment module 2, so that piston cylinder assemblies 25 and 25a advance pin means 20 into tube 12a, with the tapered distal end 30 first being eased into tube 12a for a coarse alignment. This is followed by fixed stepped portions 31, 32, and 33 entering tube 12a, thereby providing successive vernier alignment adjustments for pin means 20 in tube 12a until the longitudinal axis or centerline of pin means 20 is in line with the longitudinal axis or centerline of tube 12a. This coarse and vernier adjustment alignment of pin means 20 in tube 12a is done by the operator of ROSA who uses camera and light assembly 14. If pin means 20 enters tube 12a, the carousel 1 is aligned, if pin means 20 does not enter tube 12a the operator lowers pin means 20 and jogs ROSA until pin means 20 is aligned. This is done preferably by the operator pushing the appropriate buttons on the panel board at the remote work station.

Once properly aligned, pin means 20 is retracted, and carousel 1 is rotated at a predetermined speed to bring welding module 3 directly beneath tube 12a with the centerline of laser welding module 3 being in direct alignment with the centerline of tube 12a with no further alignment adjustments being necessary.

Laser welding module 3 is particularly shown in FIG. 5. Module 3 is comprised of a laser welding head 37 which is housed in an elongated tubular housing 38 via a pneumatic bladder area 39 which allows welding head 37 to be held in place. Welding head 37 is discussed, explained, and claimed in U.S. Pat. No. 5,182,429 issuing on Jan. 26, 1993 to William E. Pirl et al., one of the inventors of the present application, and assigned to Westinghouse Electric Corporation. This U.S. Pat. No. 5,182,429 is incorporated herein by reference.

Welding head 37 and its housing 38 extend between top and intermediate plates 8e and 8d, respectively with the distal end of welding head 37 extendable through top plate 8e, as shown in FIG. 5.

Reciprocation of tubular housing 38 is done by a double acting pneumatic piston cylinder assembly 42 which is attached to cylindrical housing 38 by frames 43 and 44. A threaded cylinder rod 45 threads into top plate 8e of carousel 1. Cylinder rod 45 and bearings, not shown, allow housing 38 to be raised and lowered into tube 12a of tubesheet 6 of FIG. 1.

Housing 38 has an inlet 46 for injecting a shield gas, such as nitrogen, into housing 38 when the top of housing 38 is abutted against tubesheet 6. This forms a seal in the welding area. A bleed seal, not shown, is used to prevent air from entering the weld area created by housing 38 positioned against tubesheet 6. If air is allowed to enter the weld area, the weld generally does not meet the required specifications. Therefore, preferably, nitrogen is used as the shield gas.

An eddy current device 47 is located adjacent to bladder area 39 in the vicinity of an undercut portion 48 of cylinder housing 38.

The top of housing 38 is raised by piston cylinder assembly 42 and brought against the lower surface of tubesheet 6 and a seal is formed in the clad area between the sleeve and the inner wall of tube 12a.

A felt seal with a metal backing 38a is provided to seal against the end of tube 12a having a sleeve to be welded. A spring 38b provides axial force on seal 38a when housing 38 is against tubesheet 6. Variations in the length of the tube 12a and/or sleeve extending out of tubesheet 6 is compensated by spring 38b. In order to compensate for small leakages, nitrogen is injected into housing 38 to provide a positive pressure so that nitrogen escapes and no air from the atmosphere enters.

Once a seal is created between felt seal 38a and the bottom of tube 12a, the air in bladder area 39 is released resulting in welding head 37 being raised and positioned inside tube 12a for the laser welding operation according to the teachings of U.S. Pat. No. 5,182,429. The centerline of the eddy current device 47 is aligned with the centerline of welding head 37 by causing the eddy current device 47 to become engaged with undercut portion 48 of housing 38. This positioning of eddy current device 47 centers the weld head 37 in the center of the clad area of tube 12a.

In case of leaks, nitrogen is preferably supplied to bladder area 39 to fix welding head 37 in place within the clad area of tube 12a and the welding operation is executed. After the welding operation, housing 38 is retracted by piston cylinder assembly 42, and welding head 37 is reciprocated in tubular housing 42 by using a probe pusher located outside of the manway of steam generator 7, according to well-known principles. The debris from the welding operation falls out of tube 12a, and air nozzle 16 (FIG. 1) blows the debris from the welding head 37 and camera 14. Carousel 1 is rotated at a predetermined speed which automatically positions cleaning module 4 directly beneath tube 12a of FIG. 1.

Figure 7:
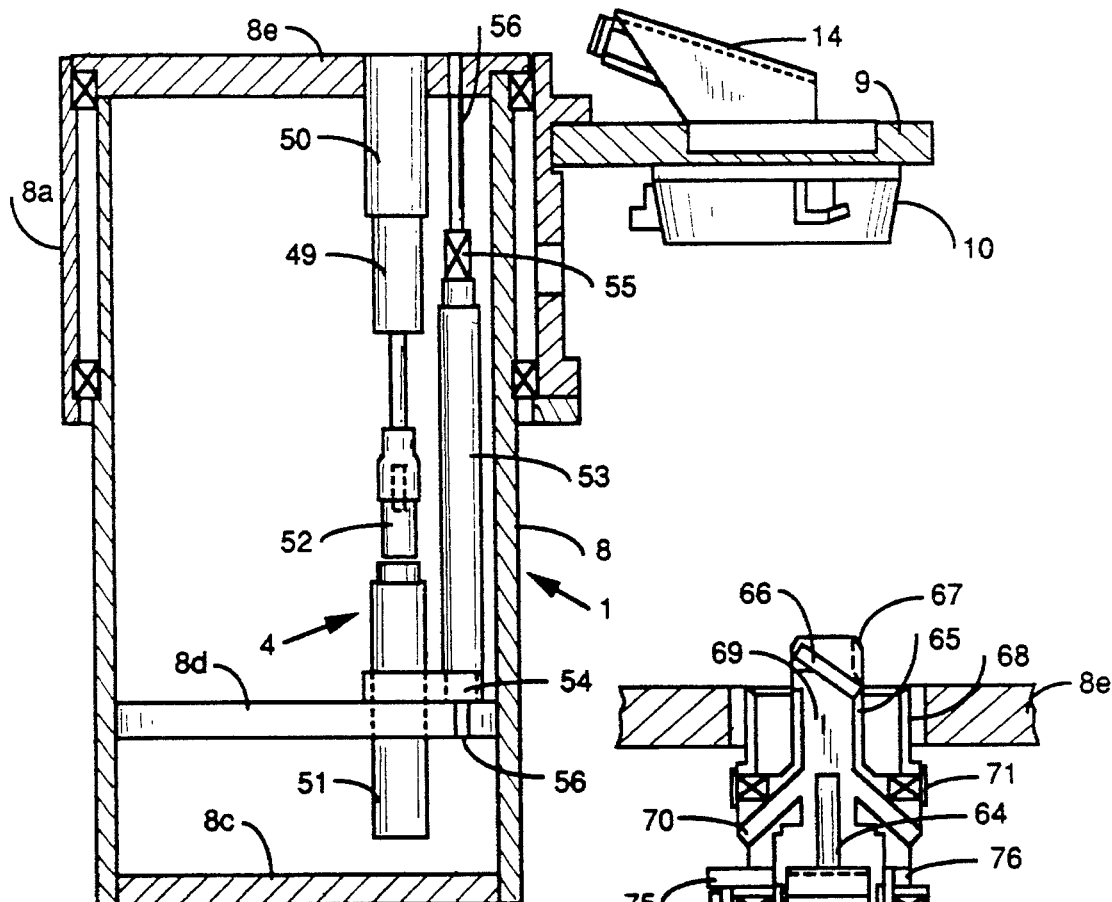
FIG. 7 is an enlarged, cross-sectional view of the carousel of FIG. 1 and carrying a brush cleaning module of FIG. 6.

Cleaning module 4 is positioned between top plate 8e and intermediate plate 8d, as particularly shown in FIGS. 6 and 7. Cleaning module 4 is comprised of a rotating air brush 49 extending in an annular guide housing 50, which, in turn, as particularly shown in FIG. 7, is mounted in top plate 8e of carousel 1. Brush 49 is connected to an air motor 51 through a coupling 52. As shown in FIG. 7, the housing of air motor 51 extends through intermediate plate 8d, and is connected to a double-acting pneumatic piston cylinder assembly 53 by a connector plate 54.

A spring element 55 is connected to piston cylinder assembly 53 and eliminates shock to the system. Cylinder assembly 53 is fixedly mounted in top plate 8e and in intermediate plate 8d by threaded cylinder rod 56, as shown in FIG. 7.

For operation of cleaning module 4 in carousel 1, air motor 51 is activated to rotate brush 49. Cylinder assembly 53 is activated to raise connector plate 54, which, in turn, raises brush 49 through annular housing 50 up into tube 12a of tubesheet 6 in FIG. 1.

After the cleaning operation is completed, brush 49 and motor 51 are lowered and retracted from tube 12a and returned to its non-operative positioning in carousel 1 as shown in FIG. 7.

Figure 8:
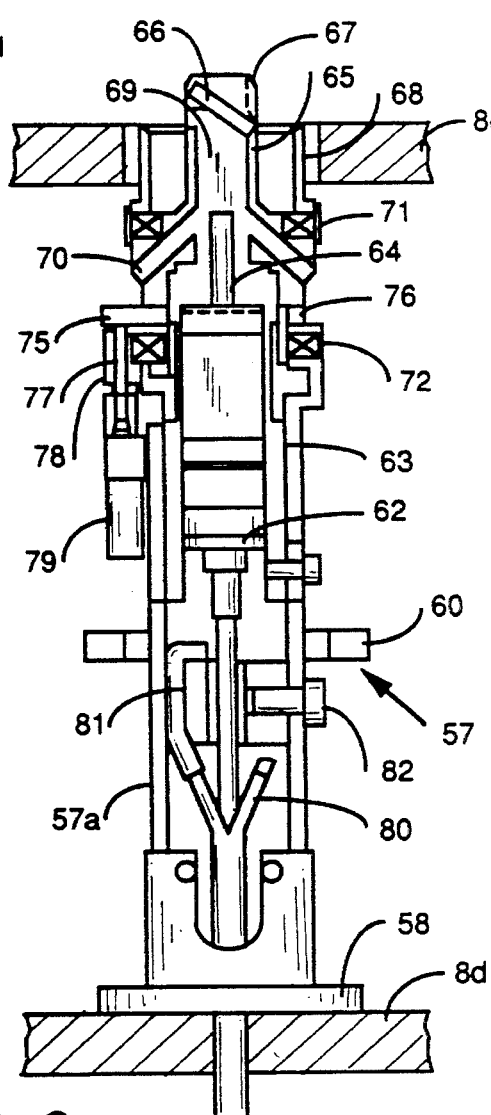
FIG. 8 is an enlarged cross-sectional view of an inspection module.
Figure 9:
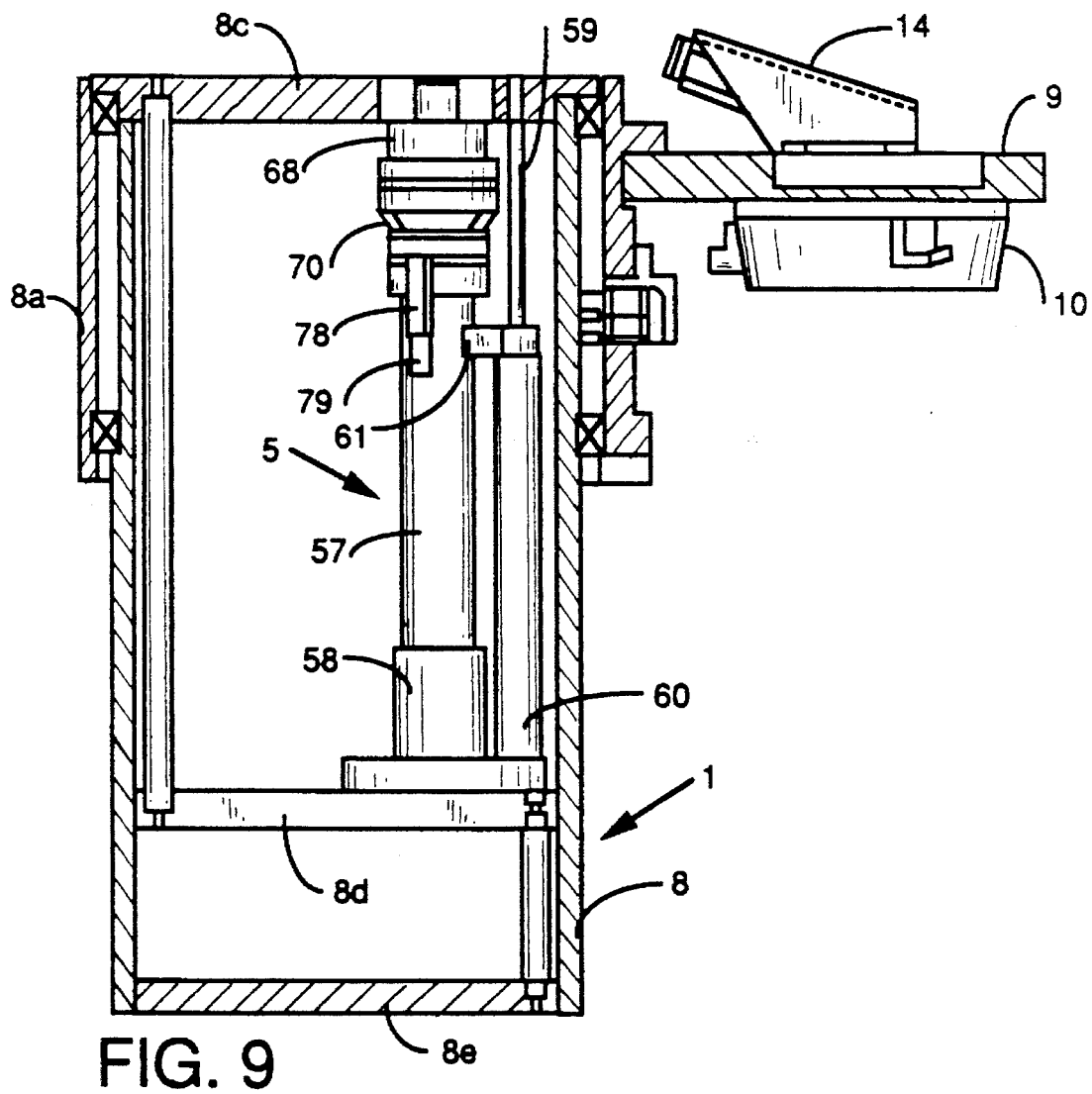
FIG. 9 is a cross-sectional view of the carousel of FIG. 1 and carrying an inspection module of FIG. 8.

Carousel 1 is then rotated at a predetermined speed which automatically positions the inspection module 5 of FIGS. 8 and 9 directly beneath tube 12a of FIG. 1. As particularly shown in FIG. 9, inspection module 5 comprises a camera mirror assembly 57 secured in an assembly support 58 supported on intermediate plate 8d. Assembly 57 along with support 58 is connected to a threaded end cylinder rod 59 of a double acting pneumatic piston cylinder assembly 60 by a connector member 61 for their reciprocation. Cylinder rod 59 is fixedly attached in top plate 8e through its threaded end.

FIG. 8 particularly shows the inside construction of camera-mirror assembly 57 which has a cylindrical housing 57a. Cylindrical housing 57a carries a camera assembly 62 mounted in one end of a shaft 63 and a camera view port 64 mounted at an end of shaft 63 opposite to that of camera assembly 62. Since the area of the camera lens tended to capture too much light, camera viewport 14 was developed to block the camera lens areas in order to create a pinhole which provides a viewable picture of the weld. Camera view port 64 extends into an upper housing 65, which carries an elliptical flat mirror 66. Mirror 66 is sandwiched between a top member 67 and upper housing 65. An outer shield housing member 68 is provided around upper housing 65. Outer housing 68 sets the distances from tubesheet 6 in which to view the weld in the clad, and is fixedly held against tubesheet 6.

Upper housing 65 has a relatively straight pathway 69 and an annular opening 70 (FIGS. 8 and 9) which intersects straight pathway 69. This arrangement for open passageways or pathways 69 and 70 allows a great amount of light from light sources 2a and 2b (FIG. 1) to enter for viewing of the welded tube clad area through camera viewport 64 via mirror 66.

Upper housing 65 is mounted in outer shield housing 68 and in cylindrical housing 57a for rotation in bearing assemblies 71, 72, 73, and 74 by pinion 75 which drives gear 76 connected to housing 65. Pinion 75 is driven by shaft 77 which extends in drive housing 78 and in turn, is driven by motor 79. From the foregoing, it is apparent that mirror 66 and housing 65 rotate within shield housing 68, while shield housing 68 and cylindrical housing 57a remain stationary.

Still referring to FIG. 8, a strain relief assembly 80 and a strain relief block 81 are provided in cylindrical housing 57a. Located about midway along cylindrical housing 57a is an adjustment screw 82. This adjustment screw 82 is rotated to adjust strain block 81. The strain relief assembly 80 is used to support the camera wire attachment, which if not supported will, most likely, separate from the camera assembly 62.

For inspection of the weld clad area in tube 12a of FIG. 1, the camera and mirror assembly 57 of FIG. 8 is raised by pneumatic piston cylinder assembly 60 into tube 12a. Motor 79 rotates mirror housing 65, which in effect rotates mirror 66. Light enters the passageways so that upon rotation of mirror 66, an image of the welded clad tube area of tube 12 is discernible by camera assembly 62, which are viewed by the operator of the ROSA robotic arm, and someone who is certified to visually inspect the weld. The weld is magnified to about ten times by the camera assembly 62 and the related equipment back to the remote work station.

After the inspection of the weld area, the camera-mirror assembly 57 is retracted from tube 12a via pneumatic piston cylinder assembly 60.

Figure 10:
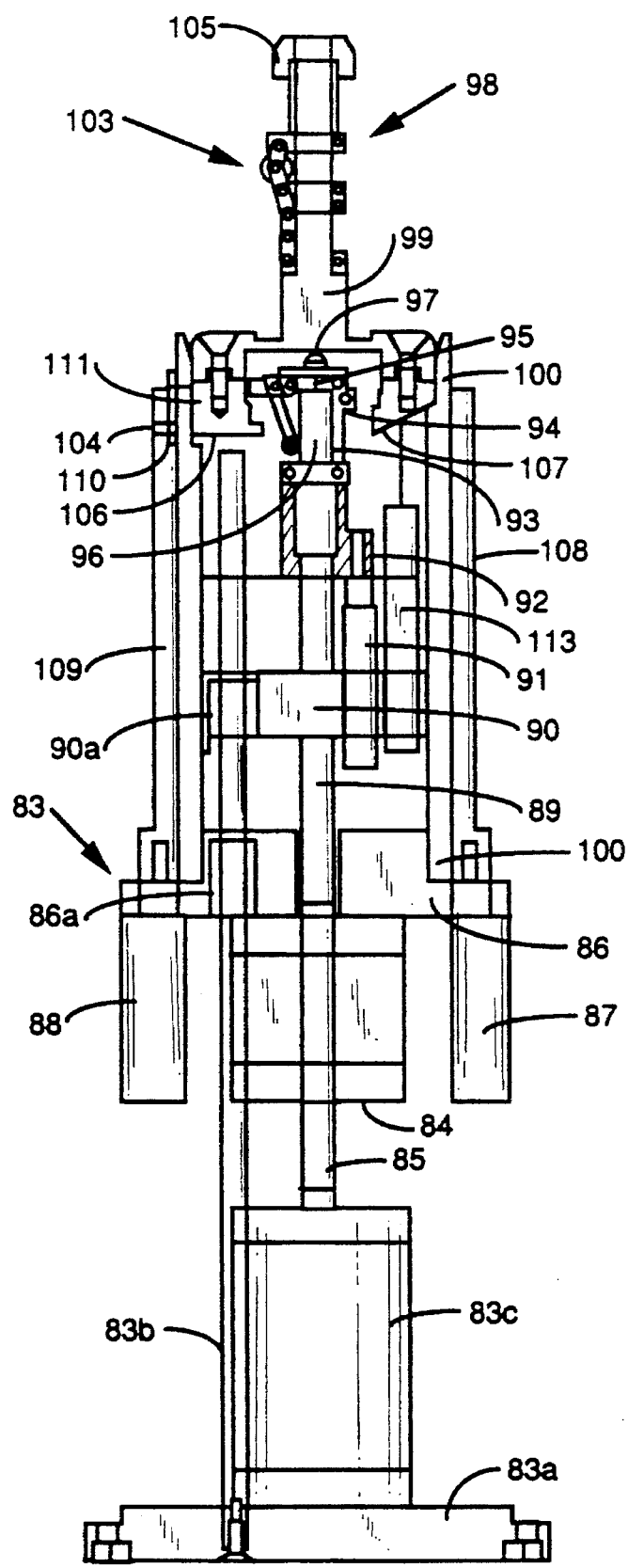
FIG. 10 is an enlarged, partly cross-sectional view of a second embodiment of an alignment module.

FIG. 10 shows a second embodiment for an alignment module 83 for aligning the centerline of carousel 1 with the centerline of tube 12a of FIG. 1. Alignment module 83 is arranged to automatically be centered by a computer without visual inspection and manual operation of the computer controls by the operator of the ROSA robotic arm, more about which will be discussed hereinafter.

Alignment module 83 has a support base 83a which when installed in carousel 1 of FIG. 1 would be supported by intermediate plate 8d. Support base 83a supports several linear rods, arranged circumferentially around support base 83a, one of which is indicated at 83b and a pneumatic piston cylinder assembly 83c. Above cylinder assembly 83c in FIG. 10 is a double acting pneumatic piston cylinder assembly 84 which is connected to cylinder 83c by cylinder rod 85. Immediately above and adjacent to cylinder assembly 84 is a lower housing member 86 which is supported at its opposite lower ends by pneumatic piston cylinder assemblies 87 and 88 for reciprocation of lower housing member 86.

Extending, through lower housing member 86 is a cylinder rod or center shaft 89 which is connected to cylinder rod 85 of piston cylinder assembly 84 at its lower end and to a member 90 at its upper end. Connected to member 90 is a pneumatic cylinder 91 which is connected to a housing 92 which is also connected to center shaft 89. Housing 92 carries arms 93, 94, and 95.

Adjacent to arms 93, 94, and 95 is a centering point device 96 which has a pin 97. Above pin 97, in FIG. 10, is an alignment pin mechanism 98 which is comprised of body member 99 and an outer housing 100.

Body member 99 supports several wheel and arm assemblies, one of which is indicated at numeral 103 and a cap member 105. At least three such wheel-arm assemblies 103 are equally spaced radially around body member 99 and are spring loaded to allow movement of pin mechanism 98 in order to enter tube 12a if alignment module 83 is initially misaligned by ROSA.

Body member 99 with outer housing 100 is mounted to several outer linear rods, two of which are indicated at 108 and 109 by way of a 110 fixedly mounted around the top of outer housing 100 near centering pin body member 99. Ring 110 has an angled groove in its sidewall for receiving pin 104 in an annular 111. Piston cylinder assembly 87 rotates ring 110 via linear rod 109 and unlocks pin 104. Cylinder 87 is retracted so that housing 100 moves down and lets body member 99 and annular member 111 free to align in tube 12a by centering wheels 103. Rounded pin 97 remains stationary and pin mechanism 98 is able to rotate and move on rounded pin 97.

Body member 99 is mounted by way of several screws, two shown at 101 and 102 to member 111 which has a flat surface portion 106 and an angled surface portion 107, which portions 106 and 107 come into contact with and are associated with several linear variable differential transducers (LVDT) or linear potentiometers, one of which is indicated at number 113, for proper positioning of body member 99, more about which will be discussed herebelow. When referring to FIG. 10, cylinder 91 is retracted and arms 95 are moved laterally and out of member 111 in order to unlock pin mechanism 98.

The potentiometers are used to align pin mechanism 98 with the centerline of the sleeve in tube 12a. At least two potentiometers at about 90° apart are used in association with flat portion means 106 and at least two potentiometers spaced at about 90° apart are associated with angled surface means 107 for a roll and pitch movement of pin mechanism 98 in order to obtain alignment of pin mechanism 98 in tube 12a. The two potentiometers on the flat surface means 106 are used for an angle correction, and the two potentiometers on the angled surface means 107 are used for an x and y axis correction.

Operation of the alignment module 83 of FIG. 10 is as follows:

Piston cylinder assembly 83c is activated to raise inner members 84, 86, 89, 90, 91, 92, 96, 99, and 100 to insert alignment body member 99 into tube 12a of FIG. 1. Once pin mechanism 98 with body member 99 is positioned in tube 12a, pneumatic cylinder 91 raises pin 97.

Pneumatic cylinder 87 retracts linear rod 109 which rotates ring 110 which moves pin 104 in the slot in ring 110. In effect, alignment pin mechanism 98 is left in tube 12a, resting on pin 97, and housing 100 is dropped below annular means 111 of pin mechanism 98.

Operation of the potentiometers are used to align pin mechanism 98 in the center of tube 12a. The potentiometers are used to tell the computer where the centerline of pin mechanism 98 is relative to the centerline of the alignment module 83 being carried by ROSA. The computer, in turn, is used to position ROSA and the alignment module 83 to align the centerline of alignment module 83 with the centerline of pin mechanism 98.

After the center point or working point for the modules 3, 4, and 5 in carousel 1 of FIG. 1 is obtained, pneumatic cylinder 91 is activated to raise arms 93, 94, and 95 and housing 92 to catch pin mechanism 98. This is proceeded by activating pneumatic cylinder 84 to raise and surround pin mechanism 98 by housing 100, followed by activating pneumatic cylinders 87 to rotate and lock alignment pin mechanism 98 in place for retraction of pin mechanism 98 out of tube 112a.

In order to remove the pin mechanism 98 from the sleeve in tube 12a, pneumatic cylinder 83 is deactivated, thereby lowering the alignment module 83. Operation of alignment module 83 can be fully programmed into a computer, and the potentiometers later monitored in order to make adjustments for the proper positioning of alignment module 83 relative to pin mechanism 98 in tube 12a.

Figure 11:
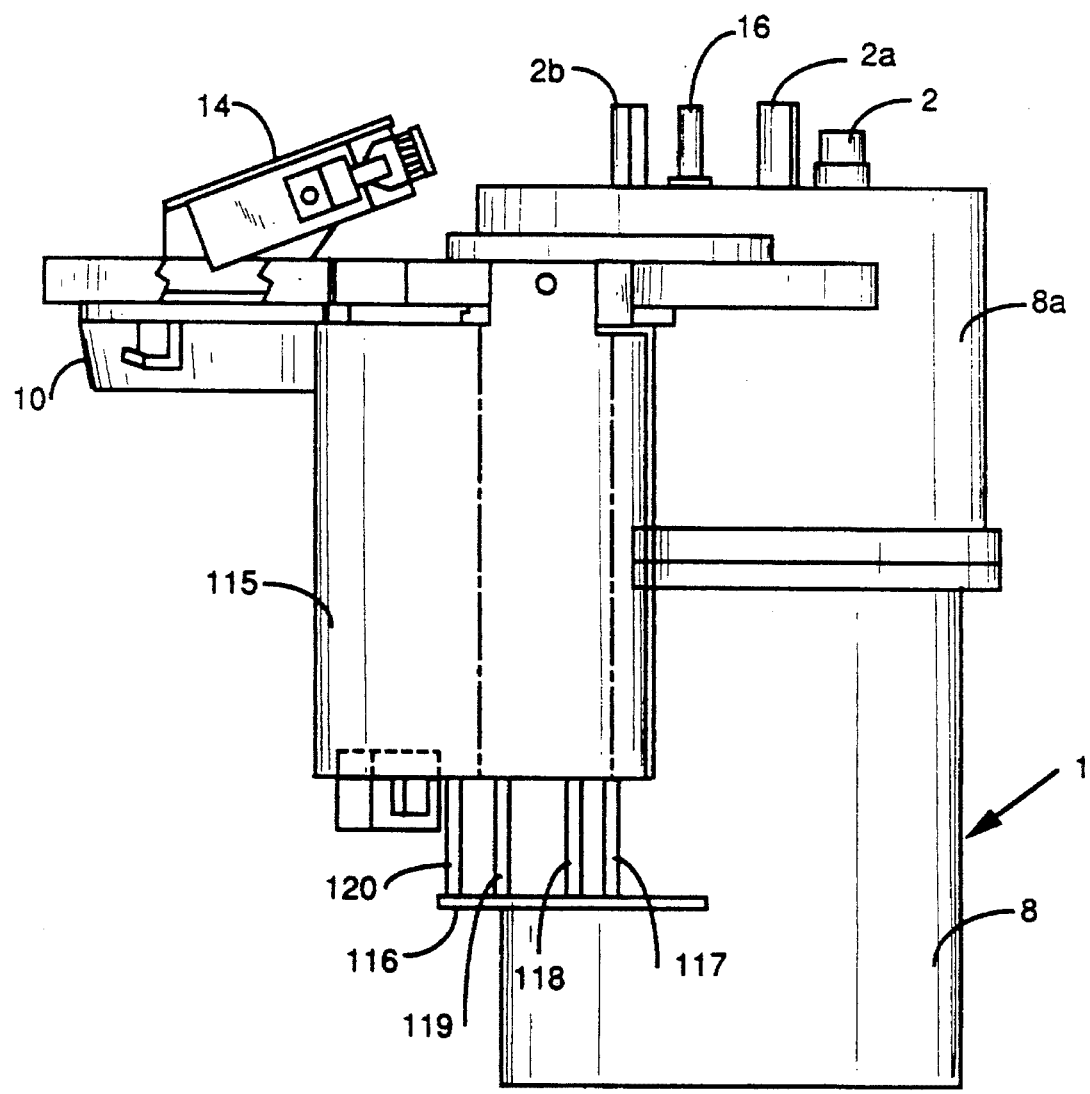
FIG. 11 is an elevational view of FIG. 1 rotated about 180° degrees relative to that of FIG. 1.

FIG. 11 shows carousel 1 rotated about 180° degrees with respective to that of FIG. 1, and illustrates a valve housing 115 which houses a manifold-solenoid assembly for delivery an air supply to the several pneumatic cylinders of the tools of modules 2, 3, 4 and 5 of carousel 1.

A connector mount 116 beneath housing 115 is supported by metal rods 117, 118, 119, and 120 and carries the multiwire electrical cable for the several modules 2, 3, 4, and 5.

While the present invention has been discussed in connection with the embodiment thereof, and its designated use, it should be understood that there may be other embodiments and uses which fall within the spirit and scope of the invention as defined by the following claims.

In accordance with the provisions of the patent statutes, we have explained the principles and operation of our invention and have illustrated and described what we consider to be the best embodiments thereof.

We claim:

1. An apparatus mounted on a remotely operated robotic arm for performing a welding operation of a lower portion of a damaged tube in a tubesheet area of a nuclear steam generator, comprising:

frame means attached to said robotic arm, and carousel means carried by said frame means and positionable in the vicinity of the damaged tube to be welded and carrying several tool modules used for said welding operation and an alignment module, said alignment module having pin means with a diameter which increases inwardly from its distal end, means for remotely and manually operating and controlling said pin means of said alignment module by an operator of said robotic arm for insertion of said pin means into said damaged tube to be worked on and for the alignment of said carousel means relative to said damaged tube to be worked on and thereafter for removal of said pin means from same said damaged tube presently being worked on, and means for rotating said carousel means at a predetermined speed to sequentially register each of said tool modules for their sequential operation in said same damaged tube presently being worked on for said welding operation after said alignment of said carousel means by said pin means of said alignment module and said removal of said pin means from said same damaged tube presently being worked on.

2. An apparatus of claim 1, wherein said pin means has a continuous tapering surface.

3. An apparatus of claim 1, wherein said pin means has several discrete portions.

4. An apparatus of claim 1, wherein said carousel means, said alignment module, and said tool modules have a centerline, and wherein the radial distance from said centerline of said carousel means to said centerline of said alignment module, and said tool modules is the same.

5. An apparatus of claim 1, wherein said pin means of said alignment module consists of:

first means located near its distal end for first obtaining a gross alignment of said carousel means, second means located inwardly from said distal end adjacent to said first means for obtaining a further alignment of said carousel means, and third means adjacent to said second means for obtaining a vernier alignment of said carousel means relative to said damaged tube to be welded.

6. An apparatus of claim 1, further comprising means for registering and means for indexing said alignment module and said tool modules in said carousel means relative to said frame means after said rotation of said carousel means.

7. An apparatus of claim 6, wherein said carousel means includes housing means and aperture means around a peripheral surface of said housing means, wherein said means for registering include groove means and limit switch means representative of said alignment module and said tool modules, and wherein said means for indexing includes slidable pin means engageable in said aperture means of said housing means.

8. A method for remotely performing a welding operation of a sleeve within a lower portion of a damaged tube in a tubesheet area of a nuclear steam generator, the steps comprising:

employing frame means attached to a remotely operated robotic arm, employing rotatable carousel means carried by said frame means which supports an alignment module with hydraulically operated pin means and several tool modules for a welding operation, positioning said carousel means within said frame means and positioning said frame means by said robotic arm to dispose said pin means of said alignment module in the vicinity of said damaged tube to be worked on, manually and remotely controlling and operating said pin means of said alignment module so as to insert said pin means of said alignment module into said damaged tube to be welded to obtain alignment of said carousel and therefor alignment of said tool modules relative to the same said damaged tube presently being worked on, removing said pin means from said same damaged tube after said alignment of said carousel and said tool modules with said same damaged tube, and after said removal of said pin means from said same damaged tube and said alignment of said carousel, sequentially rotating said carousel at a predetermined speed and automatically interrupting said rotation for the sequential operation of each of said tool modules relative to said same damaged tube for said welding operation of said same damaged tube without further alignment of said carousel relative to said same damaged tube presently being worked on.

9. A method of claim 8, the steps further comprising:

employing pin means with a diameter which increases inwardly from its distal end for obtaining a gross to a vernier alignment of said alignment module in said damaged tube.

* * * * *